UNITED STATES PATENT OFFICE.

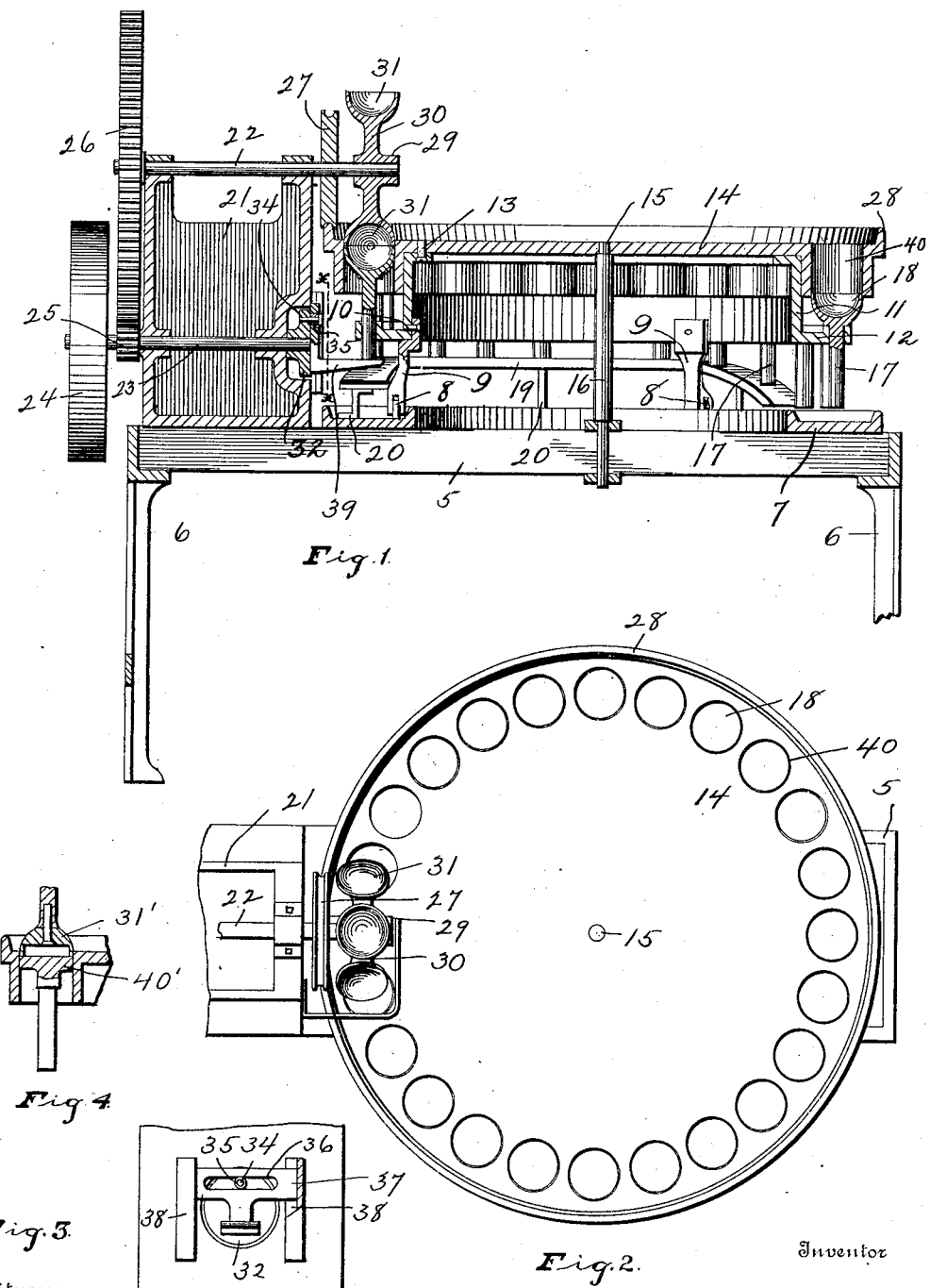

WERD W. TURNBULL, OF COLUMBUS, OHIO.

MACHINE FOR MAKING POPCORN BALLS.

No. 897,682.  Specification of Letters Patent.  Patented Sept. 1, 1908.

Application filed October 16, 1907. Serial No. 397,699.

*To all whom it may concern:*

Be it known that I, WERD W. TURNBULL, a citizen of the United States, residing at Columbus, in the county of Franklin and State of Ohio, have invented certain new and useful Improvements in Machines for Making Popcorn Balls, of which the following is a specification.

My invention relates to machines for making pop corn balls, the object of the invention being to provide a device of this character adapted to continuously form pop corn into balls as long as the machine is running.

Further objects and advantages of the invention will be set forth in the detailed description which now follows.

In the accompanying drawing: Figure 1 is a central vertical section of a machine constructed in accordance with the invention, Fig. 2 is a partial plan view of said machine, Fig. 3 is a detail section upon line x—x of Fig. 1, looking toward the left, and, Fig. 4 is a detail view of a modified form of molding devices.

Like numerals designate corresponding parts in all of the figures of the drawing.

Referring to the drawing, the numeral 5 designates the base of the machine which is supported upon legs 6. An annular track 7 is formed in this base and rollers 8 travel in this track. These rollers are journaled in brackets 9 and these brackets are in turn bolted as at 10 to an annular ring 11. This ring is provided with an outstanding flange 12 and is bolted as at 13 to a mold table 14. This mold table is in turn held in a central position by the reduced portion 15 of a shaft 16, said shaft being supported from the base 5. The stems 17 of cups 18 pass through the outstanding flange 12, the lower ends of these stems being adapted to travel over a cam member 19 which is supported by brackets 20.

The base 5 carries a bearing block 21 having bearings formed therein for the reception of shafts 22 and 23. A driving pulley 24 is mounted upon the shaft 23 as is also a pinion 25. This pinion meshes with a large gear wheel 26, said gear wheel being mounted upon the shaft 22. The shaft 22 also carries a grooved pulley 27, the grooved periphery of this pulley bearing upon an upstanding annular flange 28 of the mold table 14. Secured to the inner end of the shaft 22 is a hub 29 having a plurality of radial arms 30 extending therefrom, these arms terminating in cup-like molds 31.

A disk 32 is mounted upon the inner end of the shaft 23. A wrist pin 34 carried by this disk supports an anti-friction roller 35 and this anti-friction roller travels in a slot 36 (see Fig. 3) of a cross head 37. The ends of the cross head 37 enter ways 38 of the frame. The cross head 37 carries an inwardly projecting foot 39 which serves a purpose hereinafter described.

The operation of the device is as follows: The mold table 14 rotates and carries with it the ring 11 and consequently the mold cups 18, said mold cups lying beneath and traveling through pockets 40 which are formed in the mold table. Rotation is imparted to the mold table by the cups 31, which act in the nature of gear teeth to engage the pop corn balls that project out of the pockets 40 as will be hereinafter described. As the table rotates the pockets at the right hand side of the table in Fig. 1 are filled with pop corn that is to be molded into balls. This pop corn is held together by molasses and it is to be understood that the mass to be molded is a more or less sticky one. When the filled pockets reach such a position that their respective plungers 17 overlie the inwardly extending foot of the cross head 37, the cross head during its upward movement will engage the stems or plungers 17, to force the cups 18 upwardly and to thereby compress the material in that particular pocket into the form of a ball, said material being caught between the cup 18 and the cup 31 which at that time overlies the cup 18. Rotation of the shaft 22, it will now be seen, will impart rotation to the table 14, for the pop corn ball lies partly within the cup 31 and partly within the cup 18. The center line of the cup 31 will move in a straight line transversely across the machine, while the center of the cup 18 will be traveling upon the arc of a circle and to prevent the pop corn ball from being twisted and distorted under these conditions, the shaft 22 is permitted a certain amount of endwise play, there being a space left between the face of the pulley 27 and the hub 29 and the pulley 27 is secured upon the shaft 22 with a feather or sliding key.

It is desirable as the pop corn balls move out of engagement with the cups 31 to hold the cups 18 in an elevated position until the pop corn balls can be picked out of the pockets 40 and to accomplish this the cam member 19 is provided, this cam member underlying the lower ends of the stems or plungers 18 as the pop corn balls travel away from the cups 31, said cam members serving to hold the cups 18 in an elevated position until the balls can be picked out of the pockets. These cups remain in this position until they reach the descending portion 41 of the cam, when they will drop to the position illustrated at the right hand side of Fig. 1.

In Fig. 4 a modified form of mold device has been shown adapted to mold square blocks. In this case the upper mold which corresponds to the cup 31, is pivotally mounted to turn with relation to its rotative support 30. By virtue of this construction the mold twists bodily with relation to its rotative support as the cups 40' move from beneath the cups 31', it being understood that these cups are rectangular in form.

The purpose of the disk 27 is to hold the table 14 down during the upward movement of the cup 18, for as before stated, the mass to be molded is a sticky one and there might be a tendency for the table to be bodily lifted if this disk 27 were not provided.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a horizontally rotating member having a plurality of mold pockets formed therein, of cup-like plungers movably mounted within said pockets, a series of vertically rotating cup-like molds adapted to coact with the cup-like plungers, and means for bodily elevating said cup-like plungers when they reach a position beneath the vertically rotating molds.

2. In a device of the character described, the combination with a horizontally rotating member having a plurality of mold pockets formed therein, of cup-like plungers movably mounted within said pockets, a series of vertically rotating cup-like molds adapted to coact with the cup-like plungers, means for bodily elevating said cup-like plungers when they reach a position beneath the vertically rotating molds, and means for holding said cup-like plungers in an elevated position during a portion of the rotation of the horizontally rotating member.

3. In a device of the character described, the combination with a horizontally rotating member having a plurality of mold pockets formed therein, of cup-like plungers movably mounted within said pockets, a series of vertically rotating cup-like molds adapted to coact with the cup-like plungers, means for bodily elevating said cup-like plungers when they reach a position beneath the vertically rotating molds, and a fixed cam member over which the lower ends of said plungers are adapted to ride, said cam serving to hold the cup-like plungers in an elevated position during a portion of the rotation of the horizontally rotating member.

4. In a device of the character described, the combination with a horizontally rotating member having a plurality of mold pockets formed therein, of cup-like plungers movably mounted within said pockets, a series of vertically rotating cup-like molds adapted to coact with the cup-like plungers, means for bodily elevating said cup-like plungers when they reach a position beneath the vertically rotating molds, and a vertically rotating bearing member bearing upon the horizontally rotating member to resist the upward thrust of the cup-like member.

5. In a device of the character described, the combination with a rotative table having a plurality of pockets open both at the top and the bottom formed therein, of cup-like plungers mounted to move bodily with said table, a plurality of cup-like molds mounted to rotate at right angles to the table and to coact with the cup-like plungers to compress the body of plastic material between them, and means for elevating said cup-like plungers when they come into alinement with the bodily rotating molds.

6. In a device of the character described, the combination with a bodily rotative table having a plurality of pockets formed therein open both at the top and at the bottom, of a plurality of cup-like plungers disposed in said pockets and mounted for bodily rotation with the table, a vertical reciprocatory cross head adapted to elevate said plungers, and a plurality of bodily rotative mold members adapted to coact with said cup-like members to compress a body of plastic material between them, the rotation of said mold members imparting movement to the rotative table.

7. In a device of the character described, the combination with a bodily rotative table having a plurality of pockets formed therein open both at the top and at the bottom, of a plurality of cup-like plungers disposed in said pockets and mounted for bodily rotation with the table, a vertical reciprocatory cross head adapted to elevate said plungers, a plurality of bodily rotative mold members adapted to coact with said cup-like members to compress a body of plastic material between them, the rotation of said mold members imparting movement to the rotative table, and a fixed cam member adapted to hold said plungers in an elevated position after they pass away from said cross head.

In testimony whereof I affix my signature in presence of two witnesses.

WERD W. TURNBULL.

Witnesses:
L. CARL STOUGHTON,
A. L. PHELPS.